United States Patent [19]

Försterling

[11] Patent Number: 5,638,678
[45] Date of Patent: Jun. 17, 1997

[54] HYDRAULIC DRIVE SYSTEM

[75] Inventor: Heino Försterling, Lohr-Steinbach, Germany

[73] Assignee: Mannesmann-Rexroth GmbH, Lohr, Germany

[21] Appl. No.: 488,841

[22] Filed: Jun. 9, 1995

[30] Foreign Application Priority Data

Jun. 13, 1994 [DE] Germany .................. 44 20 619.4

[51] Int. Cl.$^6$ .................................................. F16Q 31/02
[52] U.S. Cl. .................................................. 60/447; 60/448
[58] Field of Search .............................. 60/447, 448, 413

[56] References Cited

U.S. PATENT DOCUMENTS

| | | | |
|---|---|---|---|
| 2,983,101 | 5/1961 | Tyler | 60/447 |
| 4,531,367 | 7/1985 | Backe et al. | 60/447 |

FOREIGN PATENT DOCUMENTS

| | | |
|---|---|---|
| 0551589 | 7/1993 | European Pat. Off. |
| 3441185 | 5/1986 | Germany . |
| 3907409 | 9/1990 | Germany . |

OTHER PUBLICATIONS

"Regelung eines Verstellmotors an einem Konstant–Drucknetz" by W. Backe, H. Murrenhoff (1981), pp. 635–636, 639–643.

*Primary Examiner*—F. Daniel Lopez
*Attorney, Agent, or Firm*—Emrich & Dithmar

[57] ABSTRACT

A hydraulic drive system includes a first driven hydrostatic machine adjustable in volume and operating as a pump supplying fluid to a supply line for maintaining an impressed pressure therein, a second hydrostatic machine which is adjustable in volume and is connected to the supply line, a valve determining the direction of rotation and the speed of the second machine by adjusting a control flow defining a desired speed value, a signal generator coupled to the second machine for generating a control flow defining an actual value of the speed, a pilot controlled valve for comparing the actual value control flow and the desired value control flow and generating a pressure difference therebetween, and an adjusting cylinder controlled by the pressure difference for setting the pivotal angle of the second machine. To increase the load stiffness and stability of the control system a hydraulic compensating volume is connected to either side of the signal generator. The compensating volume may be defined by either a hydraulic accumulator or by a compensating cylinder including a piston. The compensating volume may be provided with a resilient bias force.

14 Claims, 4 Drawing Sheets

HYDRAULIC DRIVE SYSTEM

The present invention relates to a hydraulic drive system comprising a first driven hydrostatic machine as a primary unit which is adjustable in volume of through-put, said primary unit operating as a pump supplying fluid to a supply line for maintaining an impressed pressure therein, and a second hydrostatic machine as a secondary unit which is adjustable in volume and is connected to said supply line, further comprising a speed control means controlling the speed of said secondary unit, said speed control means including a valve determining the direction of rotation and the speed of said secondary unit by adjusting a control flow defining a desired speed value, a signal generator coupled to the secondary unit for generating a control flow defining an actual value of the speed, wherein means is provided for comparing said actual value control flow and said desired value control flow and generating a pressure difference therebetween, and including adjusting means for setting the pivotal angle of said secondary unit which adjusting means is controlled by said pressure difference.

BACKGROUND OF THE INVENTION

A system of this type is disclosed in German 31 07 780. In particular, it is referred to the embodiments shown in FIGS. 2 and 3 as well as the specification relating thereto. Accordingly, a hydrostatic machine having an adjustable volume acting as a secondary unit is connected to a supply line in which a constant or, respectively, an impressed pressure is maintained which secondary unit is coupled to a signal generator supplying a fluid flow which volume is proportional to the speed of the secondary unit, i.e. said fluid flow corresponding to an actual value of the speed. A desired value of the speed is defined by a control flow which volume is adjusted by a valve. The position of the valve also determines the direction of rotation of the secondary unit. From both said control flows one defining the actual speed value and the other the desired speed value, a differential flow is produced passing through a throttle, wherein an adjusting means of the secondary unit is controlled by the pressure difference across the throttle to adjust the through-put volume of the secondary unit such that a desired speed is obtained. The document referred to discloses a directly controlled adjusting system which, of course, can be replaced by a pilot controlled system. To accomplish this, the pressure difference across the throttle which is proportional to the differential flow or, respectively, the control error is supplied to the fluid chambers of a pilot controlled valve, whereas the fluid for controlling the adjusting piston of the secondary unit is taken from the supply line of constant or impressed pressure. Furthermore, U.S. Pat. No. 4,920,747 discloses a mechanical feedback of the pivot angle of the secondary unit to the adjusting valve thus obtaining a feedback loop with respect to force or, respectively, distance.

However, due to the differential volume flow across the throttle the load stiffness of the known secondary control means is rather poor, i.e. the control reacts to load variations by substantially varying the speed.

It is thus an object of the present invention to take measures for increasing the load stiffness while maintaining or even improving the stability and sensitivity of the control means.

SUMMARY OF THE INVENTION

According to the present invention, the object referred to is solved by the feature that a hydraulic compensating volume is connected to either side of the signal generator. The throttle of the prior art for providing a pressure difference corresponding to the error or deviation of control is thus replaced by a hydraulic compensating volume which is connected to the respective control line connecting from the speed setting valve to the signal generator. The hydraulic compensating volume may be implemented by a hydraulic accumulator according to a first aspect of the present invention or by a compensating cylinder according to a second aspect of the invention, the compensating cylinder including a piston thus defining a pair of compensating chambers each being connected to one of the control lines.

Further embodiments, in particular with respect to the compensating cylinder are subject of subclaims to improve the quality of control.

Still further subclaims refer to a hydraulic pivot angle feedback as well as to a mutual pressure protection of the control lines to further improve the control process.

BRIEF DESCRIPTION OF THE DRAWING

Embodiments of the invention are described below with reference to the accompanying drawing which shows.

DETAILED DESCRIPTION OF PREFERRED EMBODIMENT

Figure 1:
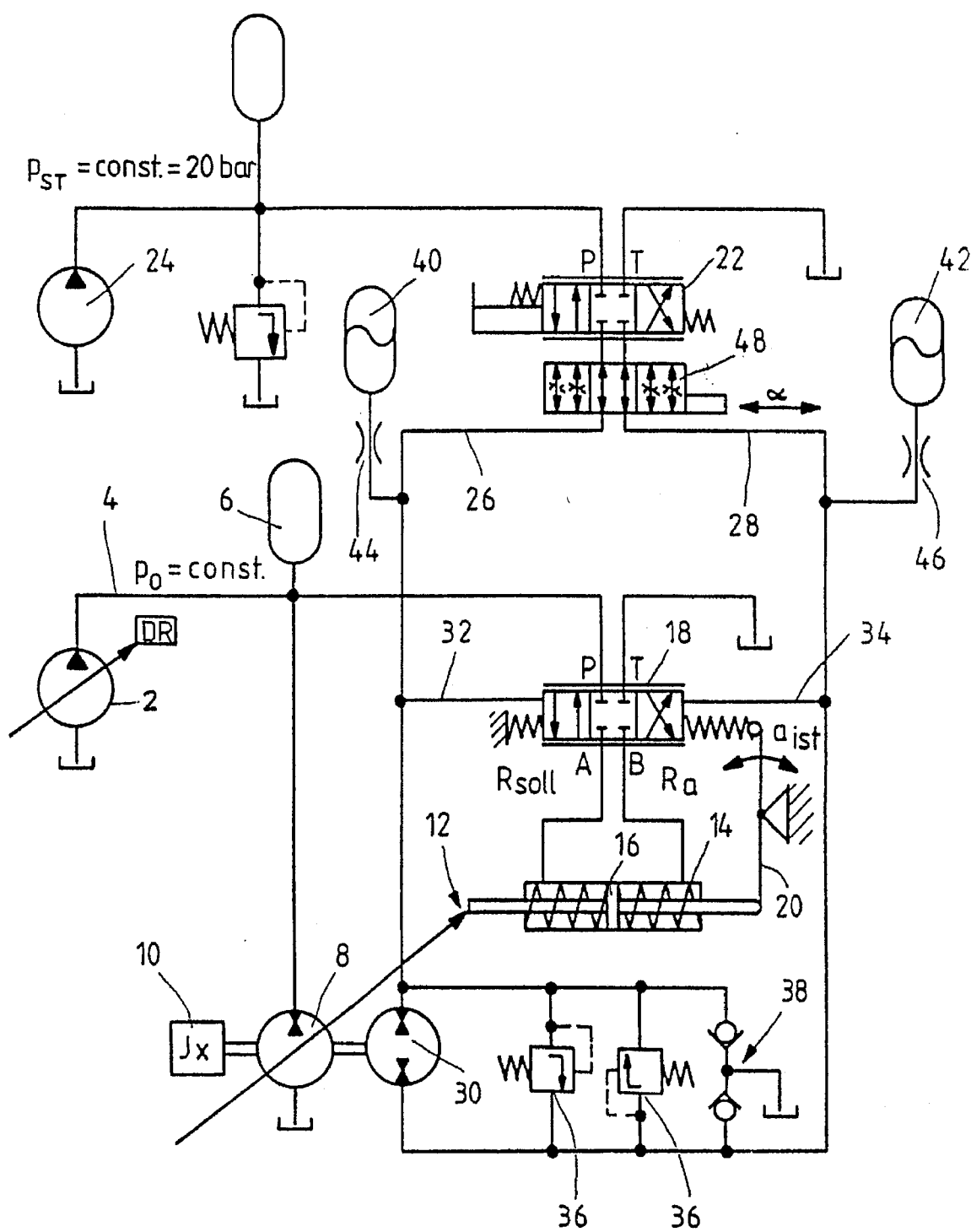
FIG. 1 a diagram of a hydraulic drive system including a primary and a secondary unit and a control system comprising a pair of compensating accumulators provided for the secondary unit, FIG. 2 a diagram similar to FIG. 1, but comprising a compensating cylinder provided for the control system, FIG. 3 a section of a compensating cylinder showing the compensating chambers being interconnected.

FIG. 1 shows a hydrostatic machine 2 having an adjustable volume which supplies pressurized fluid to a line of load-independent pressure, i.e. a line in which a constant or impressed pressure is maintained. A hydraulic accumulator 6 and a further hydrostatic machine 8 having an adjustable volume of through-put is connected to the line 4 of the latter, taking fluid from the line 4 when operating as a motor driving a load 10. The adjusting means 12 controlling the pivot angle of the machine and thus the through-put is adjustable beyond the zero position into the opposite direction in which the machine 8 operating as a pump is driven from the load 10 to supply fluid into the line 4 or, respectively, the accumulator 6. The adjusting means 12 includes an adjusting cylinder 14 housing a piston 16. The position of the piston is controlled by a pilot controlled valve 18 which may be a proportional servo valve which is connected to a reservoir and to the line 4. The position of the piston 16 and thus of the pivot angle of the secondary unit 8 is fed back through a mechanical feedback means 20 to the pilot controlled valve.

As it has been described in the documents referred to, the through-put volume of the secondary unit 8 is adjusted by the adjusting means such that the driving torque of the unit required to drive a load coupled thereto results in a certain speed of the secondary unit 8.

The control system operates as follows: a servo valve or proportional valve 22 is provided for setting the direction of rotation and a desired value of the speed which valve is connected to a control fluid pump 24 and a reservoir. In setting the position of the valve, a volume flow is adjusted which is supplied either to the control line 26 or to the control line 28 depending on the direction of rotation selected. A hydraulic signal generator 30 or tacho generator is mechanically coupled to the secondary unit 8 generating a flow which volume is proportional to the speed, the control flow of the tacho generator either being supplied to the control line 26 or 28 depending on the direction of rotation. According to the prior art, both the control lines 26 and 28 are interconnected through a throttle (which is not shown). The difference of the volume flow set by the valve 22 (desired value of speed) and the volume flow supplied by the tacho generator 30 (actual value of speed), thus the volume flow difference which is proportional to the control speed error thus flows across the throttle (not shown) thus generating a pressure difference across the throttle corresponding to the value of the control error. This pressure difference is supplied via the connecting line 32, 34 to the control chambers of the pilot controlled valve 18 to accordingly adjust the piston 16 for controlling the pivot angle of the secondary unit 8 resulting in controlling the speed by increasing or decreasing the through-put of volume of the unit 8.

As it is further known, valves 36 and check valves 38 are provided for a pressure protection of the control system. The system as described above is known.

According to the invention, the throttle of the prior art (not shown in FIG. 1) is replaced by a pair of hydraulic accumulators 40, 42 each one being connected through a throttle 44, 46 to the control line 26, 28. The throttles are not necessarily required, but improve the stability of the drive system.

While the control deviation $\Delta q$ of the known system which is defined by the difference of the volume flows generates a pressure difference $p_A-p_B$ (linear model) the pressure difference resulting in a differential volume flow $\Delta_{BL}$ across the throttle, the system according to the present invention provides a control behaviour which is governed by the elasticity of the compensating volume being available in the accumulators 40 and 42. The control behaviour or control characteristic is further governed by the combination of either throttle 44 or 46 and the volume of the respective accumulator 40 or 42.

In the arrangement of FIG. 1 including an elastic compensating space in the accumulators, the compensating volume flow depends on the pressure difference $p_A-p_{Sp}$, this being valid for $t \rightarrow 0$. In a first approximation the pressure difference is $p_A-p_{Sp}=\frac{1}{2}(p_A-p_B)$. To obtain the same effect as explained above, a correspondingly increased throttle aperture for 44, 46 is required, wherein "the same effect" may be approximately obtained only for $V_{Sp} \rightarrow \infty$ or for $t \rightarrow 0$ for accumulators of a finite capacity. This is fully sufficient for stabilizing the control process. Accordingly, this arrangement provides for a maximum stationary load stiffness which is only dependent on the inner leakage of the components.

The apertures of the throttles 44, 46 may be differently selected in response to the direction of flow to further improve the stability and the control characteristics. In response to the flow direction, the throttle apertures may be varied by throttle valves or throttle check valves, for example.

FIG. 1 shows a further valve 48 which is provided in the control line 26, 28 which valve 48 may be positioned such that different throttle apertures may be adjusted for the control volume flow. The positioning of the valve 48 is performed in response to the pivot angle of the secondary unit 8, or the position of the adjusting means 12. The valve may be either actuated mechanically or electrically. The volume flow for the desired value may be thus varied in response to the pivot angle to avoid a fluid supply to the control system which is too low.

Figure 2:
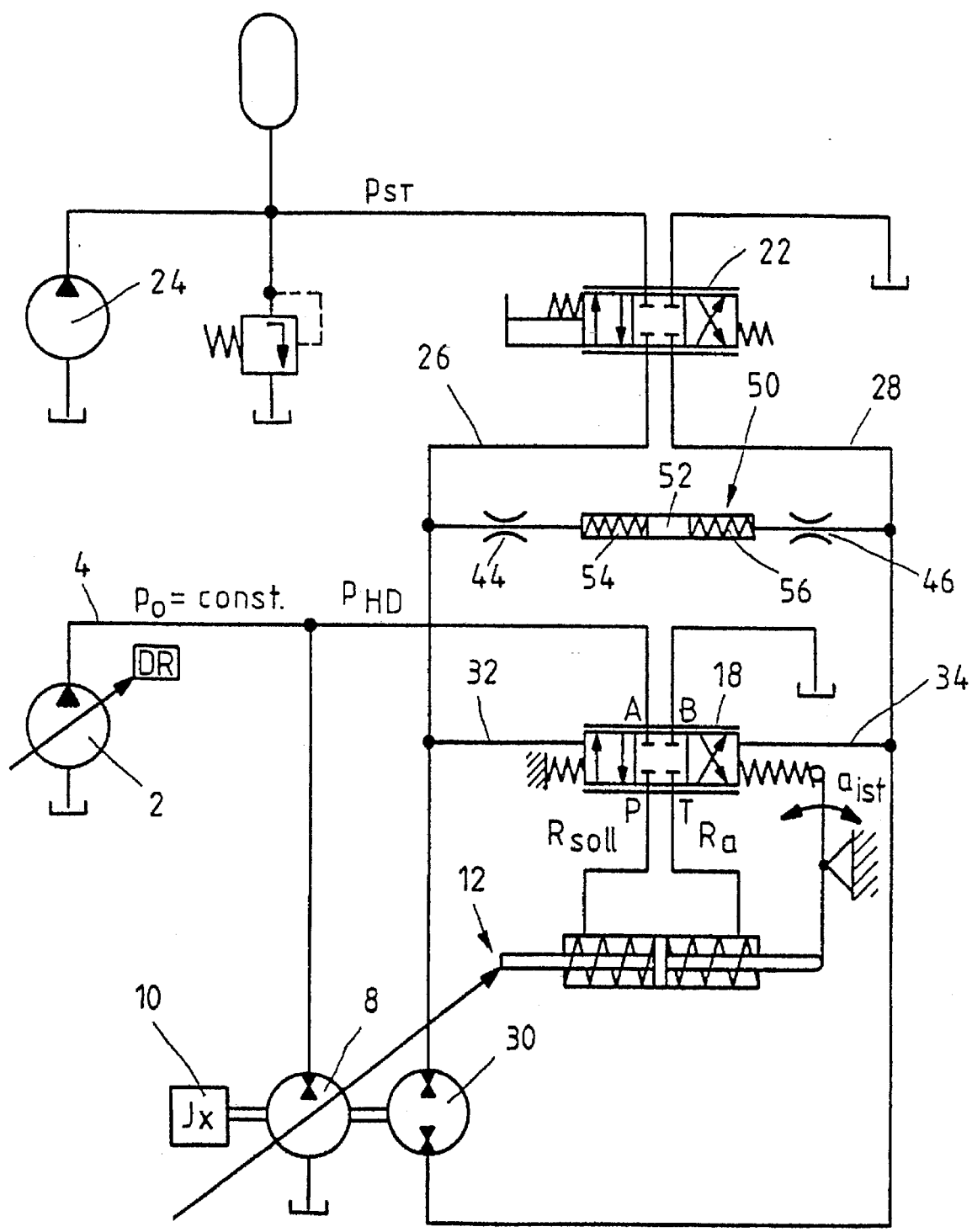

FIG. 2 shows a further embodiment of the invention, identical components bearing identical reference numerals. However, the hydraulic accumulators 40 and 42 are replaced by a compensating cylinder 50 shown in FIG. 2, including a piston 52 which is biased by a spring each acting on either face thereof, the piston 52 subdividing the cylin-der in a pair of compensating chambers 54, 56 either one being connected through a throttle 44, 46 to the control lines 26 and 28.

This embodiment of the invention is characterized by limiting the volume flow passing through the respective throttle 44 and 46 by an elastically biased wall, i.e. the piston 52 which is subjected to resilient forces acting on either side thereof, i.e. a spring each and the pressure acting in the respective cylinder chamber. The resilient force acting on the piston may be further effected by a gas pressure of the type as provided for by the hydraulic accumulators 40, 42 shown in FIG. 1. Physically seen, a resilient bias force acting on the compensating volume is not required to obtain stability of control. Accordingly, the piston 52 may freely slide in its center position: Due to structural requirements as well as for obtaining a certain load stiffness, the piston, however, must then be resiliently biased, for example by springs or by a resiliently biased diaphragm of the accumulator. The control process becomes the more stable, the more resilient the piston or, respectively, the elastic wall in the accumulator is, but the less directly becomes the control process so that a compromise has to be found in this respect.

In the embodiment of FIG. 2 a control error or deviation of control results in a temporary volume flow passing through the throttle 44 or 46. The characteristic of stiffness or elasticity and thus the control stiffness or, respectively, the load stiffness during the control process may be voluntarily selected, for example by the resilient bias force acting on the piston 52 and/or by selecting the aperture of the throttles 44, 46 as far as permitted by the requirement of control stability. A maximum stationary load stiffness will be obtained alike in the embodiment referred to.

Figure 3:
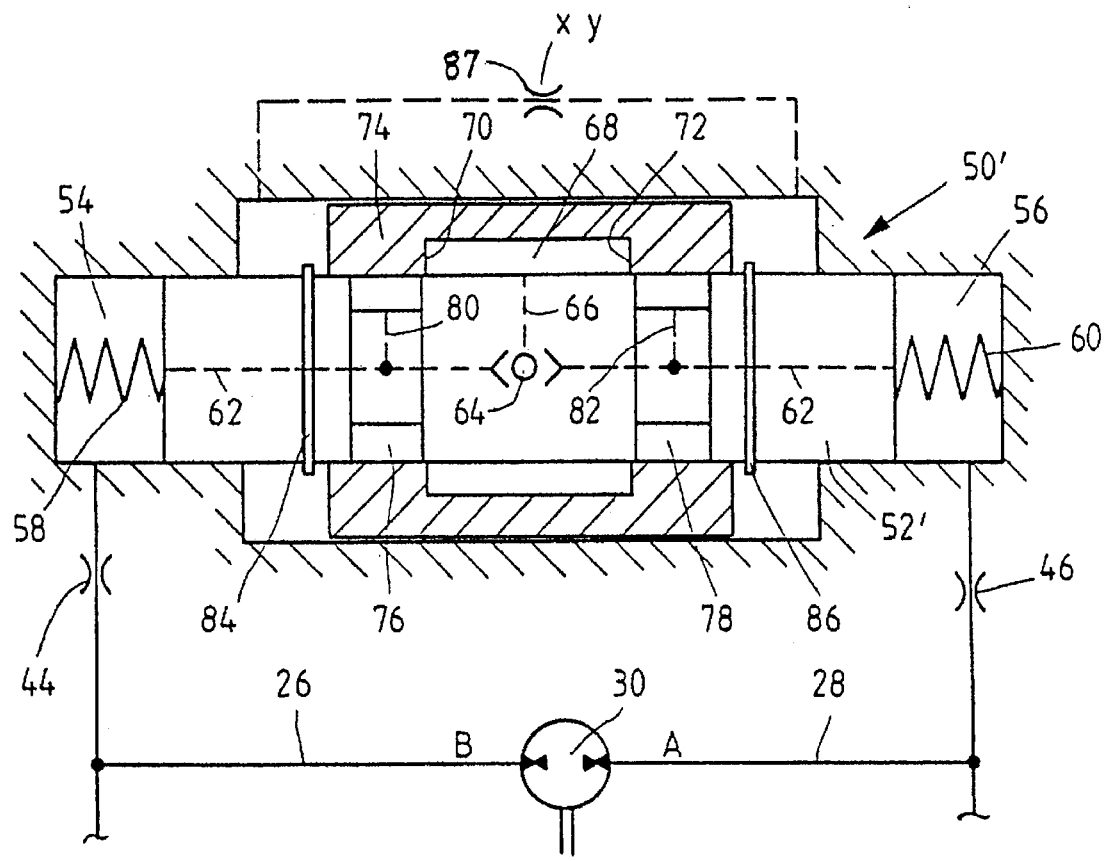

FIG. 3 shows a further embodiment of a compensating cylinder 50' including a piston 52' subdividing the cylinder into a pair of compensating chambers 54 and 56 each one being connected through a throttle 44, 46 to the control lines 26, 28 of the signal transmitter 30. The remaining components of the control system are not shown in FIG. 3, but have been disclosed in FIGS. 1 and 2.

The piston 52' is biased in a center position shown by a spring 58, 60 each provided in a respective chamber 54 and 56. Both compensating chambers 54, 56 are connected to each other through a longitudinal bore 62 extending through the piston in which bore a shuttle valve 64 is provided which is connected through a radial bore 66 to an annular chamber 68. The ends of the annular chamber are defined by control edges 70, 72 provided in a valve sleeve 74 which is slidably arranged on the piston 52'. The valve sleeve may be centrally positioned on the piston via springs (not shown). The control edges 70, 72 control the fluid flow from the chamber 68 to an annular groove 76, 78 each of the piston 52' and from there through a radial bore 80, 82 each one opening into the longitudinal bore 62. Stops 84, 86 limit the sliding movement of the valve sleeve 74.

The operation of the compensating cylinder shown in FIG. 3 is as follows: When the speed of the secondary unit changes, either caused by a change of load or by varying the desired speed value, a control error Δq follows and the hydraulic tacho generator 30 delivers a volume flow into the line 28, for example and thus through the throttle 46 into the compensating chamber 56 thus moving the piston 52' towards the left against the force of the spring 58. The fluid displaced from the compensating chamber 54 is returned through the control line 26 to the tacho generator 30. When moving the piston 52 to the left, the valve sleeve 74 engages the stop 86 of the piston as the overflow is throttled in flowing through a throttle 87. The annular chamber 68 is connected by the control edge 72 to the annular groove 78 and via the radial bore 82 to the longitudinal bore 62, but this does not become effective as the shuttle valve 64 is urged onto the left seat by the pressure acting in the compensating chamber 56 which pressure is higher than the pressure in the compensating chamber 54, thus blocking the longitudinal bore 62 and the connection between the compensating chambers 56 and 54. In this way the maximum possible load stiffness is produced in the control process.

However, when the control process is overshooting, for example due to an excessive adjustment, i.e. the control error is reversed, the tacho generator 30 now supplies fluid from the compensating chamber 56 to the compensating chamber 54 to reduce the pressure in the chamber 56. To avoid a delayed response of the servo valve, the longitudinal bore 62 is activated to provide a fluid connection between the chambers 54 and 56. This is accomplished by the valve sleeve 74 which functions in response to the direction of motion of the piston 52' to open a bypass line through the radial bore 66, the annular chamber 68, the control edge 70, the annular groove 76 and the radial bore 80 opening into the longitudinal bore 62, provided the reverse movement of the piston 52' brings the valve sleeve 74 in a position to engage the stop 84. The compensating cylinder thus additionally provides for a switching function which is depending on the direction of movement for increasing the control dampening characteristic.

Furthermore, when the direction of rotation of the tacho generator 30 and thus the control error are maintained, then PB becomes larger than PA and then the shuttle valve 64 turns over to the other position. Then the connection between the compensating chambers 54 and 56 is again blocked by the shuttle valve 64 turned over and this results in a maximum load stiffness.

Figure 4:
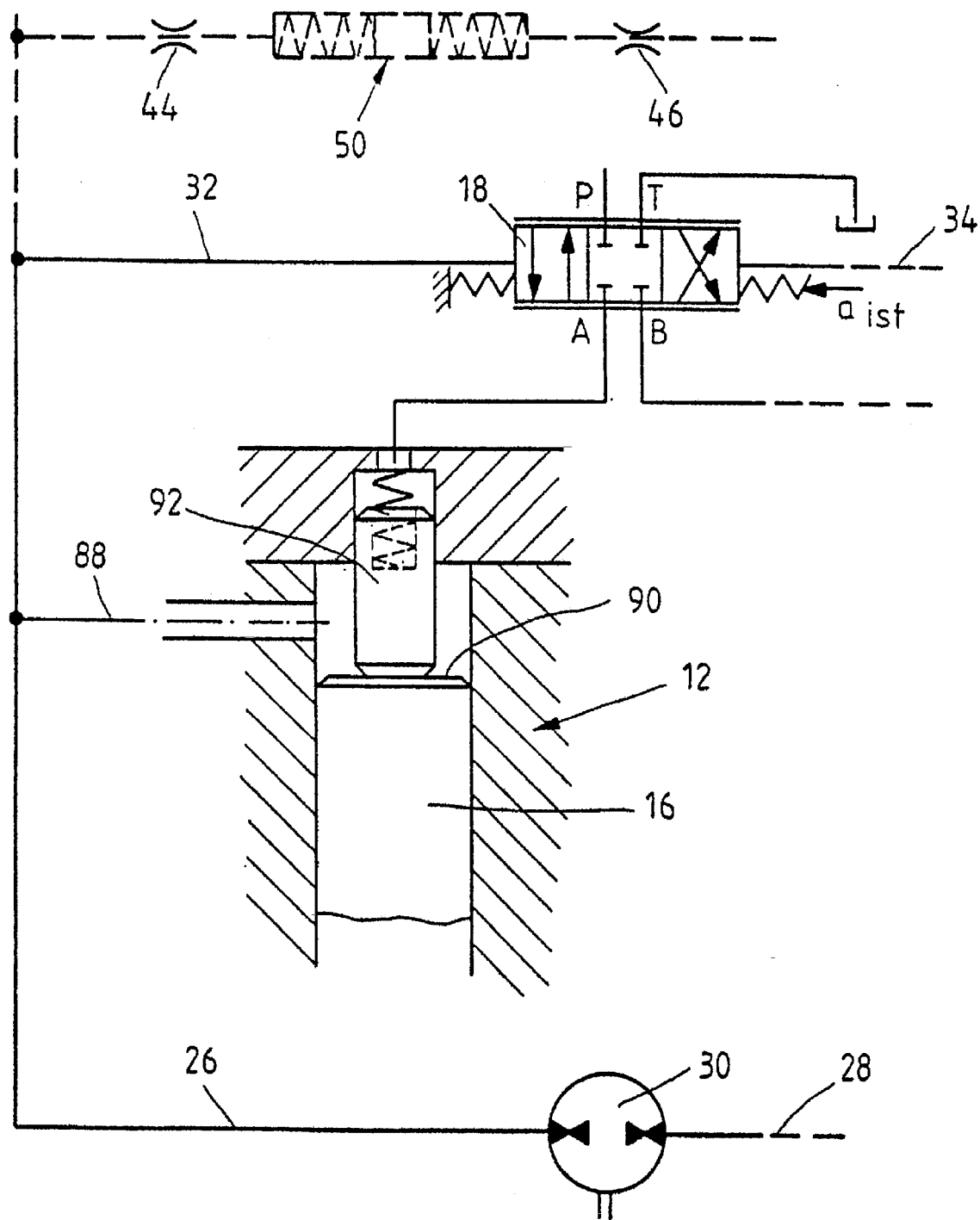
FIG. 4 a diagram of a detail of the control system comprising a hydraulic pivot angle feedback means provided on the adjusting cylinder of the secondary unit and FIG. 5 a diagram of a detail of the control system including a pressure protection of a pilot controlled valve.

According to the invention, to further stabilize the control process, the adjusting means 12 for setting the pivot angle of the secondary unit 8 is subjected to the hydraulic control error. This is shown in FIG. 4 illustrating a portion only of the control system shown in FIG. 2 including the compensating cylinder 50, the throttles 44, 46, the pilot controlled valve 18, the control line 26, 28, the tacho generator 30 and the adjusting means 12 of which the portion only is shown which is connected to the port A of the valve 18. The port B of the valve 18 is connected to the lower portion of the adjusting means not shown, but which is constructed in the same way.

According to the invention, the piston 16 of the adjusting means 12 is oppposedly subjected to the pressure in the control line 26 and to the pressure in the control line 28 as shown in FIG. 1, for example. Thus, the pressure in the control line 26 is transmitted through a line 88 to the front face 90 of the cylinder 16. This applies as well for connecting the control line 28 to the opposite front face of the piston 16. The piston 16 is furthermore positioned by the plunger 92 receiving fluid from the servo valve 18.

The embodiment shown in FIG. 4 thus provides a control process in which the pressure difference corresponding to the control error directly acts on the piston 16, whereas the high pressure serving for the very adjustment is somewhat delayed in time (due to the valve).

Subjecting the adjusting cylinder 12 to the pressure difference in the control line 26, 28 which is proportional to the control error, means a further feature of stabilizing the control process. The bearing of this measure on the adjusting process is limited to the maximum pressure difference $p_A-p_B$ and the size of the pressure engaging surface 90. The reaction of the piston movement in response to the control error acts to stabilize the process.

Figure 5:
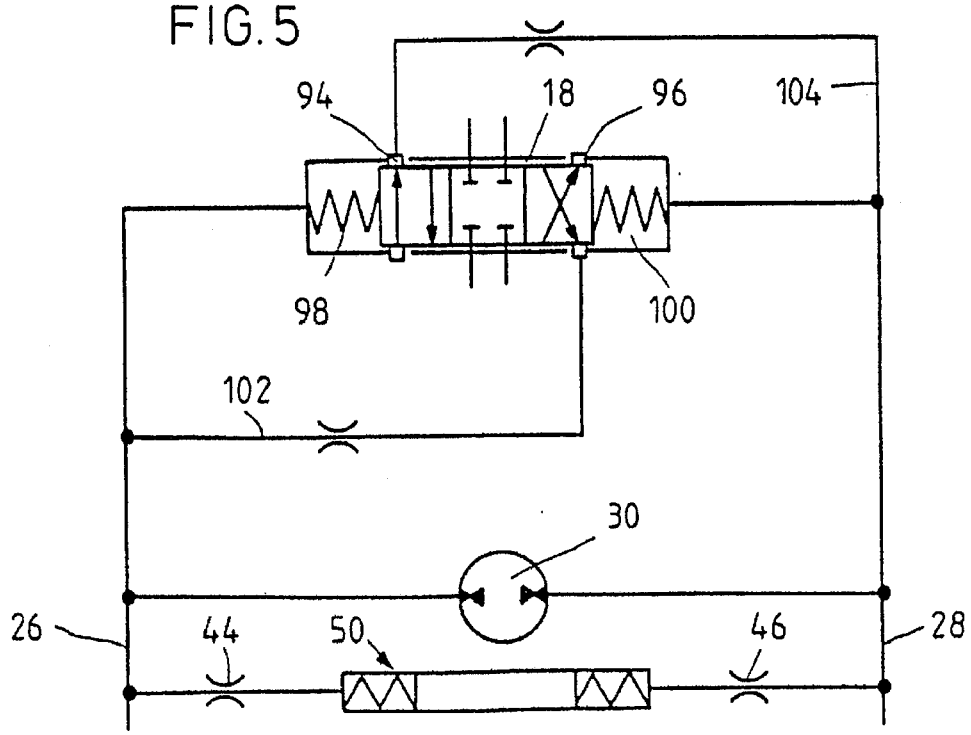

A further stabilizing feature is shown in FIG. 5. High control errors, for example in response to a steep change of the desired value may result in an overshooting of the pilot controlled valve 18. This may be counteracted by highly accurately setting the pressure limiting valves 36 (FIG. 1). However, according to the invention the servo valve 18 is provided with additional control edges 94, 96 connecting both the control chambers 98, 100 when the valve piston exceeds a maximum permissible stroke. In addition thereto, bypass lines 102 and 104 each including a throttle are provided. This ensures a pressure as well as a stroke limitation of the servo valve 18 which thus can rapidly return to its control position. A further characteristic of the servo valve 18 shown in FIG. 5 is thus the integrated structure of the mutual pressure protection.

What I claim is:

1. A drive system, comprising a first driven hydrostatic machine as a primary unit adjustable in volume, said primary unit operating as a pump supplying fluid to a supply line for maintaining an impressed pressure therein, and a second hydrostatic machine as a secondary unit which is adjustable in volume and is connected to said supply line and has a speed and a direction of rotation and a pivotal angle, further comprising a speed control means controlling the speed of said secondary unit, said speed control means including a valve determining the direction of rotation and the speed of said secondary unit by adjusting a control flow defining a desired speed value, a signal generator coupled to the secondary unit and having two ports for generating a control flow defining an actual value of the speed, wherein means are provided for comparing said actual value control flow and said desired value control flow and generating a pressure difference between the ports of the signal generator, and including adjusting means for setting the pivotal angle of said secondary unit which adjusting means is controlled by said pressure difference, characterized in that a hydraulic compensating volume is connected to each port of said signal generator.

2. The drive system of claim 1, wherein said compensating volume is defined by a pair of hydraulic accumulators.

3. The drive system of claim 1, wherein said compensating volume is defined by a compensating cylinder subdivided by a piston into a pair of compensating spaces.

4. The drive system of claim 3, wherein compensating chambers which are defined by said piston in said compensating cylinder include a valve controlled fluid interconnection which is closed and opened in response to the pressure difference in both compensating chambers and the direction of piston movement.

5. The drive system of claim 4, wherein said fluid interconnection is normally closed.

6. The drive system of claim 4, wherein said fluid interconnection opens when overshooting of the control operation occurs.

7. The drive system of claim 4, wherein said fluid interconnection includes a shuttle valve and a valve sleeve cooperating with driving means provided on said piston to open a bypass between the compensating chamber having a higher pressure each and the compensating chamber having the lower pressure each.

8. The drive system of claim 1, wherein said compensating volume is subjected to a resilient biasing force which is generated by a gas pressure, a fluid and/or mechanically by spring means.

9. The drive system of claim 1, wherein a throttle is provided for transferring fluid to and from each said compensating volume.

10. The drive system of claim 1, wherein a pilot controlled valve having pilot chambers is provided for controlling said adjusting means of the secondary unit, said adjusting means being connected through said pilot controlled valve to said supply line or, respectively, to said reservoir, wherein the pilot chambers of said valve are each connected to said signal generator.

11. The drive system of claim 10, wherein a mechanical feedback means is provided between a piston of the adjusting means and the pilot controlled valve.

12. The drive system of claim 10, wherein the piston of said adjusting means is provided with an additional fluid engaging surface on either side which is connected to a port each of said signal generator.

13. The drive system of claim 10, wherein both control chambers of the pilot controlled valve are connected to each other when the pilot controlled valve is positioned in either one of its end positions.

14. The drive system of claim 1, wherein throttles are provided to vary the fluid flow of said valve controlling the direction of rotation and the speed of said secondary unit, said throttles being differently adjustable in response to the pivotal angle of said secondary unit.

* * * * *